United States Patent
Ebata et al.

[11] 3,888,660
[45] June 10, 1975

[54] ZINC ALLOY FOR BEARING

[75] Inventors: Akira Ebata, Fujisawa; Teiji Kodate, Machida, both of Japan

[73] Assignee: Oiles Kogyo Kabushiki Kaisha, Tokyo, Japan

[22] Filed: Dec. 18, 1973

[21] Appl. No.: 425,714

[30] Foreign Application Priority Data
Dec. 25, 1972 Japan............................ 47-86394
Aug. 2, 1973 Japan............................ 48-129396

[52] U.S. Cl. .......................... 75/178 A; 75/178 R
[51] Int. Cl. ..................... C22c 21/00; C22c 21/04
[58] Field of Search ...................... 75/178 A, 178 R

[56] References Cited
UNITED STATES PATENTS

| | | |
|---|---|---|
| 2,196,034 | 4/1940 | Schulze............................ 75/178 A |
| 2,516,737 | 7/1950 | Wilson.............................. 148/32 |
| 2,720,076 | 11/1955 | Sachara............................ 57/140 |
| 3,254,993 | 6/1966 | Urban et al........................ 75/135 |
| 3,785,811 | 1/1974 | Pelzel.............................. 75/178 A |

*Primary Examiner*—C. Lovell
*Assistant Examiner*—E. L. Weise
*Attorney, Agent, or Firm*—Oldham & Oldham Co.

[57] ABSTRACT

This invention relates to alloys for bearings having superior properties namely endurable to load of more than 170 kg/cm$^2$, removing a tendency of seizure and having a good wear resistance. One of the said alloys for bearings consists essentially of about 2–4 wt% of Si and 0.1–0.5 wt% of Ti or 0.3–1.0 wt% of Zr and 17–27 wt% of Al and a residual amount of Zn.

Another of the said alloys for bearings comprises the composition of 0.5–1.0 wt% of Zr, 17–27 wt% of Al and a residual amount of Zn.

9 Claims, 5 Drawing Figures

×100

ZINC ALLOY FOR BEARING

BACKGROUND OF THE INVENTION

1. Field of the Invention

This invention relates to an improvement of a zinc alloy for a bearing consisting of aluminum, silicon, an element of the group IVa of the periodic table (except Hf) and a main component of Zn, particularly this invention relates to the zinc alloy for bearings having superior properties in the antifriction property, the load carrying capacity, the antiseizure property, good castability and good machinability.

2. Description of Prior Art

In the past, zinc alloy has been utilized in manufacturing various kinds of elements or parts, for example machine elements or parts or daily necessaries by means of diecasting owing to a low cost and a good castability of the zinc alloy.

Recently, some attempts have been directed to the improvement of the zinc alloy for bearings, but the many disadvantages as to the insufficient antifriction property and the insufficient load carrying capacity, essentially the tendency of the abnormal wear due to being subject to seizure to a mating material have not yet solved.

The good dimentional stability and the easiness for forming the smooth sliding surface are important factors of the bearing material, and also the superior machinability is one of the important factors of the bearing material.

It has been proved from our experiments that the Zn-Al alloy containing 22 wt% of Al shows a relatively good bearing property by the aid of lubricant oil but does not show the antiseizure property, the good load carrying capacity and the sliding velocity, and also that the said Zn-Al alloy shows the bearing property comparable to the bronze casting (BC6) of A.S.T.M. B30 Alloy 4A at a sliding velocity less than 30m/min., but the said alloy is subject to seizure to the sliding surface of the mating material. Hence abnormal wear at a sliding velocity slightly more than the said velocity may occur up to the maximum load of 110 kg/cm² but there also is a fear of occurring the abnormal wear under a load of slightly more than 110 kg/cm² and also that the said alloy makes it difficult to provide a bearing having good stability and a very smooth sliding surface owing to the bad machinability of the said alloy.

SUMMARY OF THE INVENTION

This invention relates to providing a Zn-Al alloy for bearings having superior bearing properties overcoming the above mentioned disadvantages.

In detail, this invention relates to providing the Zn-Al alloy for bearings endurable to the maximum load of more than 170 kg/cm², almost removing the tendency of seizure and having good wear resistance by adding either (1) 2–4 wt% of Si, and 0.1–0.5 wt% of Ti or 0.3–1.0 wt% of Zr or (2) 0.5–1.0 wt% of Zr to the Zn-Al alloy containing 17–27 wt% of Al. It has been confirmed that the said alloys possess the superior qualities of good castability as well as good machinability.

DESCRIPTION OF THE PREFERRED EMBODIMENT

Figure 1:
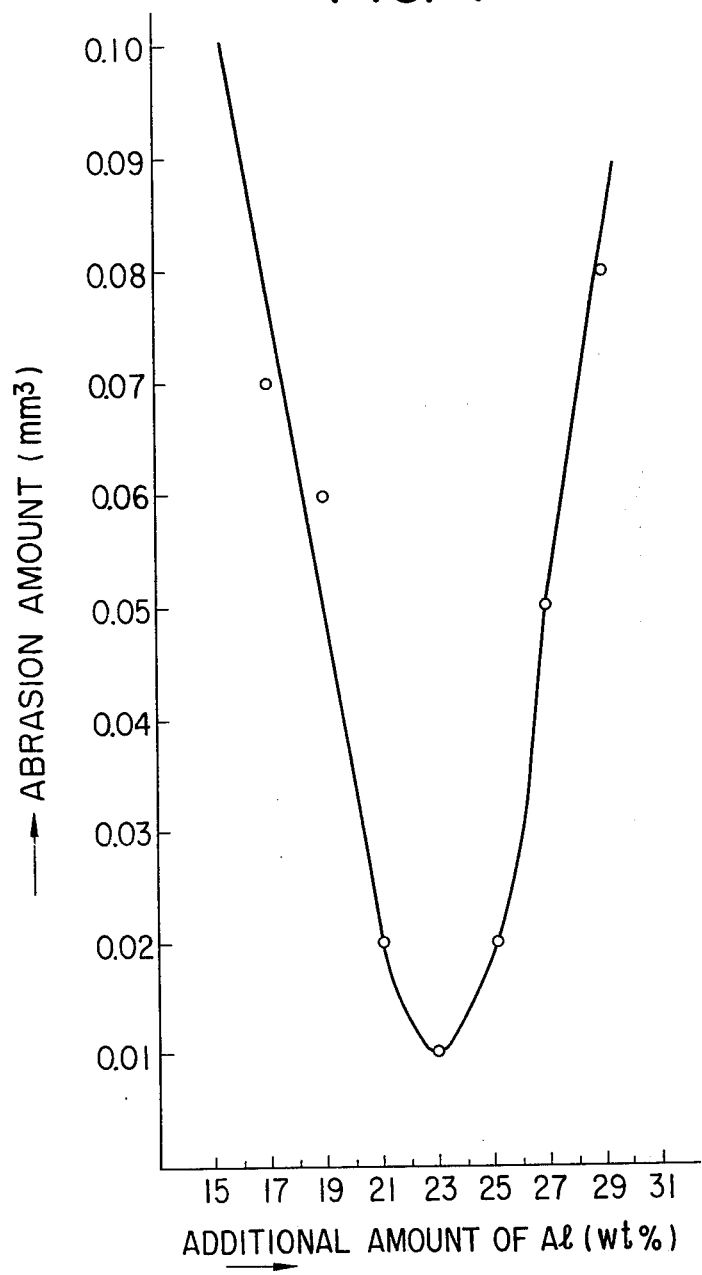
FIG. 1 is a diagram showing the interrelationship between the additional amount of Al element to the Zn-Al alloy containing 3 wt% of Si and 0.3 wt% of Ti and the abrasion amount (the amount of wear) of the said alloy.

On studying the Zn-Al alloy for bearings, the inventors of this application have found the following facts:

1. In the Zn-Al-Si alloy, the sole addition of Si increases the maximum load to 130–140 kg/cm² and improves the wear resistance and the machinability but does not contribute to the improvement of the antiseizure property. In detail, the sole addition of Si not only increases the amount of wear but also retains the risk of occurring the abnormal wear in the neighborhood of the maximum load.

2. In the Zn-Al-Ti alloy, the sole addition of Ti increases the maximum load to 140–150 kg/cm² and contributes to the improvements of the wear resistance and the machinability, but does not contribute to the improvement of the antiseizure property the same as in the case of the sole addition of Si. In the specification, the abnormal wear differs from the normal wear which very slowly and proportionally progresses according to the factors of the friction distance and the friction time, and abnormal wear means the violent wear together with the abrasive, the scoring or the seizure.

3. In the Zn-Al-Si-Ti alloy of this invention, the joint addition of Si and Ti not only increases the maximum load to more than 170 kg/cm² but also bring the joint effect of completely removing the tendency of seizuring the said alloy to the mating material and of avoiding abnormal wear. If a large amount, more than 5 wt% of Si is added to the said alloy, the friction coefficient of the said alloy increases, on the contrary, the machinability is injured. While if less than 2 wt% of Si is added to the said alloy, the improvement of the antifriction and the wear resistance is not satisfactory.

If more than 0.5 wt% of Ti are added to the said alloy, the castability of the said alloy is injured, while if less than 0.1 wt% of Ti is added to the said alloy, the wear resistance is not improved.

4. In the Zn-Al-Si-Zr alloy of this invention, the effect of Zr is similar to that of Ti. The said effect does not occur, in the case that less than 0.3 wt% of Zr is added to the said alloy. As the castability of the alloy decreases in the case that more than 1 wt% of Zr is added to the said alloy, it is preferable to limit the amount of Zr to 0.3–1 wt% in the Zn-Al-Si-Zr alloy.

5. In the Zn-Al-Zr alloy of this invention, if about 0.3 wt% of Zr is added alone to the said Zn-Al alloy, the additional effect begins to appear, but if 0.3–0.5 wt% of Zr is added to the said alloy, the obtainable effect is not the same as that obtainable from the joint use of Si and Zr in the Zn-Al alloy, and the wear resistance and the antiseizure properties are not satisfactorily improved. If 0.5–1.0 wt% of Zr are solely added to the Zn-Al alloy, the obtainable effect is the same as the effect obtainable from the joint use of Si and Zr in the Zn-Al alloy. If more than 1.0 wt% of Zr are added to the Zn-Al alloy, the amount of wear increases thereby depressing the bearing property and being not obtained the satisfactory fluidity of the molten mass and the improved castability.

The sole addition of 0.5–1 wt% of Zr remarkably displays the additional effect in comparison with the sole addition of Si or Ti and increases the maximum load to 170 kg/cm$^2$. Although as mentioned above, the sole addition of Zr could not improve the wear resistance in the Zn-Al-Zr alloy having a low content namely 0.3–0.5 wt% of Zr, the joint use of Zr and Si remarkably increases the wear resistance of the Zn-Al-Si-Zr alloy having the low content of Zr.

In conclusion, the improvement of the wear resistance of the Zn-Al-Si-Zr alloy having the low content of Zr is very significant for the following reasons; namely, the greater the addition of Zr is very significant for the following reasons; namely, the more the addition of Zr increases, the more the castability of the alloy tends to decrease.

In view of the said matter, the joint use of Si and Zr endows preferable properties for example the good castability, to the Zn-Al alloy for bearings having the low-content of Zr.

6. In the Zn-Al alloy, if the amount of Al reaches to 17 wt%, reduction of wear of the bearing begins to appear and if the amount of Al reaches to 22–24 wt%, the said effect is increased remarkably. If the said amount of Al reaches to more than 27 wt%, on the contrary, the wear resistance of the bearing is injured. The effect of the wear resistance obtainable from the addition of Al depends on the improvement of the hardness of the alloy.

If 17 wt% of Al is added to the Zn, the vickers hardness of 50 HV, increases to that of about 75 HV. If the amount of Al increases to 17–27 wt%, the vicker's hardness reaches to 85–90HV. Even if the additional amount of Al reaches to more than 27 wt%, the hardness of the alloy does not change, but the effects of Si, Ti and Zr are not obtained so that the wear resistance decreases.

Figure 2:
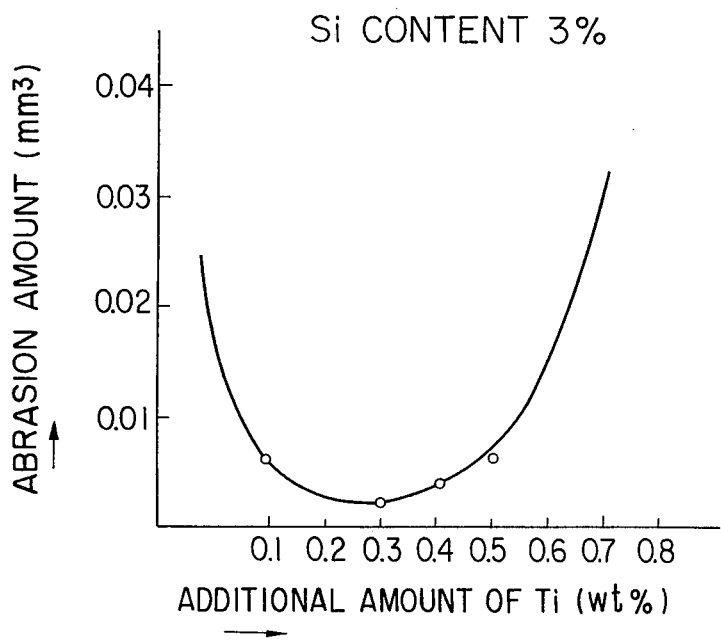
FIG. 2 is a diagram showing the interrelationship between the additional amount of Ti element to the Zn-22%Al alloy containing 3 wt% of Si, and the amount of wear thereof.
Figure 3:
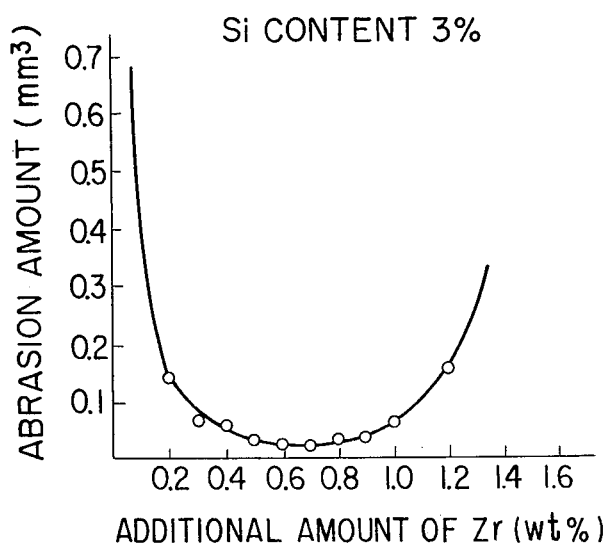
FIG. 3 is a diagram showing the interrelationship between the additional amount of Zr element to the Zn-22%Al alloy containing 3 wt% of Si, and the amount of wear thereof.
Figure 4:
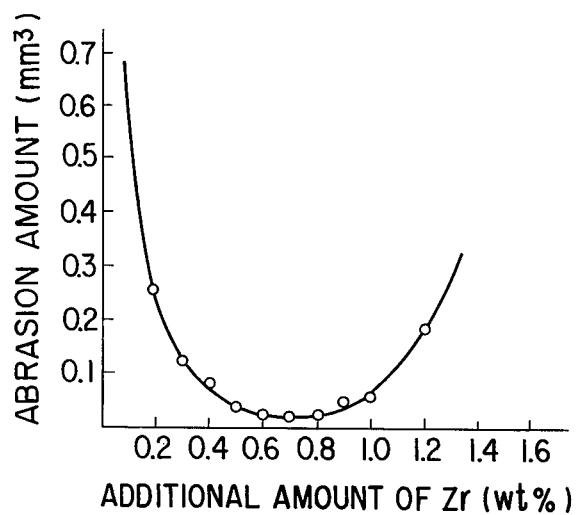
FIG. 4 is a diagram showing the interrelationship between the additional amount of Zr element alone to the Zn-22wt%Al alloy and the amount of wear thereof.

It has been observed from the FIGS. 1–4 that the maximum effect of the wear resistance is obtained in the Zn-Al alloy containing about 20 wt% of Al (FIG. 1) and in the Zn-Al-Si-Ti alloy containing 0.2–0.4 wt% of Ti. (FIG. 2).

And also it has been observed from the said figures that the maximum wear resistance effect is obtained in the Zn-Al-Si-Zr alloy (FIG. 3) and in the Zn-Al-Zr alloy (FIG. 4) containing 0.6–0.8 wt% of Zr.

It is to be noted that in the Zn-Al-Si-Zr alloy containing the predetermined amount of Si appears the joint effect of Si and Zr namely the improvement of the wear resistance, in the range of the low contact of Zr, namely of 0.3–0.5 wt%, on the contrary, in the Zn-Al-Zr alloy having the low content of Zr namely 0.3–0.5 wt% of Zr and not having Si, the improvement of the wear resistance is not obtained satisfactorily.

This invention is explained by means of the following examples but is not limited to the following examples.

EXAMPLE 1

Al, the Al-5% Ti master alloy and the Al-30% Si alloy were melted together in a graphite crucible at the temperature of 750°C. The predetermined amount of Zn metal was added and melted into the molten mass so as to get the predetermined alloy constituents while maintaining the molten mass at the temperature of 750°C. The molten mass obtained, was poured into a metallic mold preheated at the temperature of about 100°C.

EXAMPLE 2

Al, the Al-5% Zr master alloy and the Al-30% Si alloy were melted together in the graphite crucible at the temperature of 750°C. The predetermined amount of Zn metal was added into the molten mass so as to get the predetermined alloy constituents while maintaining the molten mass at the temperature of 750°C and then the molten mass was poured into the metallic mold preheated at the temperature of 100°C.

EXAMPLE 3

Al, and the Al-5%Zr master alloy were melted together in the graphite crucible at the temperature of 750°C, and then the predetermined amount of Zn was added to the molten mass so as to get the predetermined alloy constituents while maintaining the molten mass at the temperature of 750°C. The molten mass obtained was poured into the metallic mold preheated at the temperature of 100°C. The mechanical property and the bearing performances of the Zn-Al alloy for bearings are shown in the following table.

In the table, the examples Nos. 6, 9, 10, 17, 18, 24, 25, 26, 27 and 34 are those having the alloy constituents other than the alloy constituents of this invention. By the bearing performance test, the characteristic features of the wear resistance were determined according to the following procedures.

Dimentions of the test pieces: The inner dia. of 16.5 mm, the outer dia. of 20 mm, the length of 18 mm.

The mating material: S45C (carbon steel for the machine structure use) corresponding to A.S.T.M. 1045 steel.

The sliding velocity: 30m/min.

The distance of the friction: 50,000 m

The lubricant: SAE No. 30 engine oil

The tensile strength of the alloy having the alloy constituents of this invention is almost constant of 25–26 kg/mm$^2$ and the elongation thereof decreases in inverse proportion to the increase of Si in the alloy constituents. The elongation of the alloy for bearing is forced to make a sacrifice to improving the wear resistance and the antiseizure properties of the alloy.

It has been confirmed that the addition of more than 4 wt% of Si increases not only the coefficient of friction but also the brittleness thereby providing bad results.

The interrelationship between the structure of the alloy of this invention and the wear resistance and antifriction properties thereof are shown as follows:

1. The influence of the amount of Si on the structure of the alloy. In the examples Nos. 6–9, it has been observed that the deposit of Si increases in the structure of the alloy according to the increasement of Si, but when the addition of Si is 1 wt%, the deposit state of Si becomes unclear and the distinction between the deposit of Si and that of Ti becomes unclear, since Ti deposits in the alloy structure as in intermetallic compound. When the addition of Si is 2 wt%, a polygonal deposit (a plate-like deposit) is clearly observed.

When the addition of Si is 3–4 wt%, the polygonal deposit becomes large in its shape but the distribution state becomes uniform. When the addition of Si is more than 5 wt%, the shape of the deposit becomes complex, its shape crumbles and the deposit becomes larger and larger. When the addition of Si is to 2–4 wt%, the polygonal deposit of Si becomes clear in the structure thereof. The addition of 2–4 wt% of Si corresponds to the range showing the most superior wear resistance.

2. The influence of the addition of Ti on the structure of the alloy.

In the examples 1–5, it has been observed that the addition of 0.1–0.4 wt% Ti does not change the deposit state of the Zn-Al-Ti intermetallic compound but increases the deposit amount thereof. When the addition of Ti increases to 0.5 wt%, a structure showing an insufficient decomposition of the Al-5%Ti master alloy but a relatively uniform structure, has been observed. When more than 0.5 wt% of Ti are added, there is a danger of forming two non-uniform structure and in most cases, the Al-5% Ti master alloy remains as it is in the structure of the alloy without decomposing the said master alloy.

Figure 5:
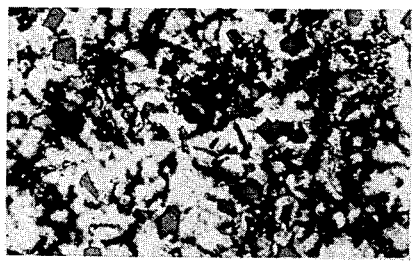
FIG. 5 is the microphotograph of the structure of the Zn-22wt%Al alloy containing Si and Ti in the sample No. 3. (100 magnifications)

As mentioned above, if large amount of Ti (more than 0.5 wt% of Ti) are added to the Zn-Al alloy, it is a bad influence to the castability of the Zn-Al-Ti alloy. In view of the said matters and the wear resistance, amount of Ti is the most preferable to be 0.1–0.5 wt%. In the microscopicphotograph of the FIG. 5, the white part of the said photograph corresponds to the Zn-Al master alloy, the grey part thereof corresponds to Si, the black particles correspond to mainly Ti.

3. The influence of the addition of Zr on the structure of the alloy.

In the examples Nos. 19–23 and Nos. 28–33, it has not been observed that there is a remarkable difference of the deposit state between the Zn-Al-Si-Zr intermetallic compound and the Zn-Al-Zr intermetallic compound, but it is observed that the uniformity and the fineness of the structure of the alloy begins to appear in the alloy containing 0.3 wt of Zr and also that the most uniform and fine structure of the alloy is formed in the Zn-Al-Zr alloy containing 0.6–0.8 wt of Zr thereby displaying the improved wear resistance of the alloy for bearings.

If the addition of Zr increases to more than 1.0 wt%, it has been observed that the structure of the alloy tends to become un-uniform and in the most, remains as it is without decomposing the Al-5% Zr master alloy. As mentioned above, the alloy for bearings of this invention having the composition of 17–27 wt% of Al, 2–4 wt% of Si and 0.1–0.5 wt% of Ti or 0.3–1.0 wt of Zr and the residual amount of Zn has been remarkably improved in certain properties namely the wear resistance, the load carrying capacity, the antiseizure property to the mating material and the machinability which said properties have not been satisfactory in the prior alloy. The alloy of this invention is useful as a superior alloy for bearings. Although the addition of Zr to the Zn-Al alloy tends to depress the castability of the said alloy, the effect of Zr remarkably appears in the addition of 0.5–1.0 wt% Zr and contributes to the improvement of the bearings performance.

Table

| Sample No. | Alloy constitutes (wt%) | | | | | Vicker's hardness (Hv) | Wear amount (mm$^3$) | Friction coefficient |
|---|---|---|---|---|---|---|---|---|
| | Zn | Al | Si | Ti | Zr | | | |
| Example 1 | | | | | | | | |
| 1  | * | 22 | 3 | 0.1 | — | 82 | 0.06 | 0.03 |
| 2  | * | 22 | 3 | 0.2 | — | 85 | 0.06 | 0.04 |
| 3  | * | 22 | 3 | 0.3 | — | 85 | 0.02 | 0.03 |
| 4  | * | 22 | 3 | 0.4 | — | 86 | 0.04 | 0.03 |
| 5  | * | 22 | 3 | 0.5 | — | 85 | 0.06 | 0.03 |
| 6  | * | 22 | 1 | 0.3 | — | 78 | 0.07 | 0.03 |
| 7  | * | 22 | 2 | 0.3 | — | 84 | 0.04 | 0.03 |
| 8  | * | 22 | 4 | 0.3 | — | 86 | 0.04 | 0.04 |
| 9  | * | 22 | 5 | 0.3 | — | 88 | 0.08 | 0.05 |
| 10 | * | 15 | 3 | 0.3 | — | 55 | 0.10 | 0.03 |
| 11 | * | 17 | 3 | 0.3 | — | 70 | 0.07 | 0.03 |
| 12 | * | 19 | 3 | 0.3 | — | 75 | 0.06 | 0.03 |
| 13 | * | 21 | 3 | 0.3 | — | 85 | 0.02 | 0.03 |
| 14 | * | 23 | 3 | 0.3 | — | 85 | 0.01 | 0.03 |
| 15 | * | 25 | 3 | 0.3 | — | 84 | 0.02 | 0.04 |
| 16 | * | 27 | 3 | 0.3 | — | 85 | 0.05 | 0.04 |
| 17 | * | 29 | 3 | 0.3 | — | 86 | 0.08 | 0.05 |
| Example 2 | | | | | | | | |
| 18 | * | 22 | 3 | — | 0.2 | 70 | 0.14 | 0.06 |
| 19 | * | 22 | 3 | — | 0.3 | 75 | 0.06 | 0.03 |
| 20 | * | 22 | 3 | — | 0.4 | 75 | 0.05 | 0.03 |
| 21 | * | 22 | 3 | — | 0.5 | 78 | 0.03 | 0.03 |
| 22 | * | 22 | 3 | — | 0.8 | 79 | 0.02 | 0.02 |
| 23 | * | 22 | 3 | — | 1.0 | 80 | 0.04 | 0.03 |
| 24 | * | 22 | 3 | — | 1.2 | 82 | 0.15 | 0.05 |
| Example 3 | | | | | | | | |
| 25 | * | 22 | — | — | 0.2 | 70 | 0.25 | 0.07 |
| 26 | * | 22 | — | — | 0.3 | 74 | 0.12 | 0.04 |

Table — Continued

| Sample No. | Alloy constitutes (wt%) | | | | | Vicker's hardness (Hv) | Wear amount (mm³) | Friction coefficient |
|---|---|---|---|---|---|---|---|---|
| | Zn | Al | Si | Ti | Zr | | | |
| 27 | * | 22 | — | — | 0.4 | 74 | 0.08 | 0.04 |
| 28 | * | 22 | — | — | 0.5 | 78 | 0.03 | 0.03 |
| 29 | * | 22 | — | — | 0.6 | 78 | 0.02 | 0.02 |
| 30 | * | 22 | — | — | 0.7 | 78 | 0.01 | 0.02 |
| 31 | * | 22 | — | — | 0.8 | 79 | 0.02 | 0.02 |
| 32 | * | 22 | — | — | 0.9 | 79 | 0.04 | 0.03 |
| 33 | * | 22 | — | — | 1.0 | 80 | 0.04 | 0.03 |
| 34 | * | 22 | — | — | 1.2 | 82 | 0.18 | 0.05 |

*residue

We claim:

1. An alloy for bearings consisting essentially of about 17–27 wt% of Al, about 2–4 wt% of Si, about 0.1–0.5 wt% of Ti and the remainder Zn.

2. An alloy for bearings as in claim 1 where the Al content is from about 22–24 wt%.

3. An alloy for bearings as in claim 1 where the Ti content is about 0.2–0.4 wt%.

4. An alloy for bearings consisting essentially of about 17–27 wt% of Al, about 2–4 wt% of Si, about 0.3–1.0 wt% of Zr and the remainder Zn.

5. An alloy for bearings as in claim 4 where the Al content is from about 22–24 wt%.

6. An alloy for bearings as in claim 4 where the Zr content is about 0.6–0.8 wt%.

7. An alloy for bearings consisting essentially of about 17–27 wt% of Al, about 0.5–1.0 wt% of Zr and the remainder Zn.

8. An alloy for bearings as in claim 7 where the Al content is from about 22–24 wt%.

9. An alloy for bearings as in claim 7 where the Zr content is about 0.6–0.8 wt%.

* * * * *

UNITED STATES PATENT OFFICE
CERTIFICATE OF CORRECTION

Patent No. 3,888,660   Dated June 10, 1975

Inventor(s) Akira Ebata et al

It is certified that error appears in the above-identified patent and that said Letters Patent are hereby corrected as shown below:

Section 30 of the heading of the above patent correct 47-86394 to -- 47-129396 -- correct 48-129396 to -- 48-86394 --

Signed and Sealed this

*thirtieth* Day of *September 1975*

[SEAL]

Attest:

RUTH C. MASON
*Attesting Officer*

C. MARSHALL DANN
*Commissioner of Patents and Trademarks*